(12) United States Patent
Chung et al.

(10) Patent No.: US 9,095,844 B2
(45) Date of Patent: Aug. 4, 2015

(54) CATALYST FOR AQUEOUS PHASE REFORMING OF BIOMASS-DERIVED POLYOLS AND PREPARATION METHOD THEREOF

(75) Inventors: Young Min Chung, Daejeon (KR); Tae Jin Kim, Daejeon (KR); Seung Hoon Oh, Seoul (KR); Dilek Ayse Boga, Utrecht (NL); Pieter C. A. Bruijnincx, Utrecht (NL); Bert M. Weckhuysen, Utrecht (NL)

(73) Assignee: SK Innovation Co., Ltd., Seoul (KR)

( * ) Notice: Subject to any disclaimer, the term of this patent is extended or adjusted under 35 U.S.C. 154(b) by 276 days.

(21) Appl. No.: 13/704,282

(22) PCT Filed: Jun. 29, 2010

(86) PCT No.: PCT/KR2010/004207
§ 371 (c)(1),
(2), (4) Date: Feb. 21, 2013

(87) PCT Pub. No.: WO2011/158988
PCT Pub. Date: Dec. 22, 2011

(65) Prior Publication Data
US 2013/0143733 A1 Jun. 6, 2013

(30) Foreign Application Priority Data
Jun. 14, 2010 (KR) ........................ 10-2010-0056026

(51) Int. Cl.
| | |
|---|---|
| *B01J 23/72* | (2006.01) |
| *B01J 23/89* | (2006.01) |
| *B01J 21/04* | (2006.01) |
| *B01J 21/10* | (2006.01) |
| *B01J 29/04* | (2006.01) |
| *B01J 37/02* | (2006.01) |
| *B01J 37/18* | (2006.01) |
| *C01B 3/32* | (2006.01) |

(52) U.S. Cl.
CPC .............. *B01J 23/8926* (2013.01); *B01J 21/04* (2013.01); *B01J 21/10* (2013.01); *B01J 29/049* (2013.01); *B01J 37/0201* (2013.01); *B01J 37/18* (2013.01); *C01B 3/326* (2013.01); *C01B 2203/0233* (2013.01); *C01B 2203/107* (2013.01); *C01B 2203/1076* (2013.01); *C01B 2203/1211* (2013.01)

(58) Field of Classification Search
CPC .. B01J 23/8926; B01J 37/0201; B01J 29/049; B01J 21/04; B01J 21/10; B01J 37/18; C01B 3/326; C01B 2203/0233; C01B 2203/1076; C01B 2203/1211; C01B 2203/107
USPC ........................................................ 502/331
See application file for complete search history.

(56) References Cited

U.S. PATENT DOCUMENTS

| | | | |
|---|---|---|---|
| 6,699,457 B2 | 3/2004 | Cortright et al. | |
| 6,964,757 B2 | 11/2005 | Cortright et al. | |
| 6,964,758 B2 | 11/2005 | Cortright et al. | |
| 2003/0170171 A1 | 9/2003 | Cortright et al. | |
| 2004/0164028 A1 | 8/2004 | Corma Canos et al. | |
| 2008/0019902 A1 | 1/2008 | Rei et al. | |
| 2008/0283798 A1 | 11/2008 | Behrens et al. | |

FOREIGN PATENT DOCUMENTS

| | | |
|---|---|---|
| CN | 1656013 A | 8/2005 |
| CN | 1729139 A | 2/2006 |
| CN | 1986049 A | 6/2007 |
| EP | 1 870 158 A2 | 12/2007 |
| KR | 1020080078911 | 8/2008 |
| WO | WO 2007/075476 | 7/2007 |
| WO | WO 2009/020244 A1 | 2/2009 |
| WO | WO 2009/129622 | 10/2009 |
| WO | WO 2011/158988 | 12/2011 |

OTHER PUBLICATIONS

L. Balduzzi et al. "FT-IR study of Pt, Cu and Pt—Cu phases supported on hydrotalcite-derived mixed oxides" Studies in Surface Science and Catalysis vol. 140, 2001, pp. 67-75.*
Basile et al.; Performance of new Pt and Pt—Cu on hydrotalcite-derived materials for NOx storage/reduction; Topics in Catalysts vols. 30/31, Nos. 1-4; Jul. 2004; pp. 223-227.
Wen et al.; Production of hydrogen by aqueous-phase reforming of glycerol; International Journal of Hydrogen Energy 33; 2008; pp. 6657-6666.
Supplementary European Search Report for corresponding application No. EP 10 85 3289; dated Jan. 9, 2014.
Huber, et al., "Raney Ni—Sn Catalyst for $H_2$ Production from Biomass-Derived Hydrocarbons", *Science*, 300, 2075 (2003).
Cortright, et al., "Hydrogen from catalytic reforming of biomass-derived hydrocarbons in liquid water", *Nature*, vol. 418, pp. 964-967, Aug. 29, 2002.
Shubaker, et al., "Aqueous-phase reforming of ethylene glycol over supported platinum catalysts", *Catalysis Letters*, vol. 88, Nos. 1-2, May 2003.
Huber, et al., "An overview of aqueous-phase catalytic processes for production of hydrogen and alkanes in a biorefinery", *Catalysis Today*, 111 (2006), 119-132.
Iriondo, et al., "Hydrogen Production from Glycerol Over Nickel Catalysts Supported on $Al_2O_3$ Modified by Mg, Zr, Ce or La", *Top Catal.*, (2008) 49:46-58.
Cruz, et al., "Hydrogen production by aqueous-phase reforming of ethanol over nickel catalysts prepared from hydrotalcite precursors", *Catalysis Communications*, 9 (2008) 2606-2611.

(Continued)

*Primary Examiner* — Colleen Dunn
*Assistant Examiner* — Haytham Soliman
(74) *Attorney, Agent, or Firm* — Richard M. Klein; Fay Sharpe LLP

(57) ABSTRACT

Disclosed herein is a catalyst for aqueous-phase reforming of biomass-derived polyols, which comprises platinum and copper as active metals and a mixture of magnesia and alumina as a support. The catalyst contains a small amount of platinum and, at the same time, has high hydrogen selectivity and low methane selectivity.

2 Claims, No Drawings

(56) References Cited

OTHER PUBLICATIONS

Wen, et al., "Production of hydrogen by aqueous-phase reforming of glycerol", *International Journal of Hydrogen Energy*, 33 (2008) 6657-6666.

Wang, et al., "Pt—Co bimetallic catalyst supported on a single walled carbon nanotube: XAS and aqueous phase reforming activity stufies", *Catalysis Today*, 146 (2009) 160-165.

Kunkes, et al., "The role of rhenium in the conversion of glycerol to synthesis gas over carbon supported platinum—rhenium catalysts", *Journal of Catalysis*, 260 (2008) 164-177.

Tang, et al., "Platinum-Loaded NaY Zeolite for Aqueous-Phase Reforming of Methanol and Ethanol to Hydrogen", *Ind. Eng. Chem. Res.*, 2009, 48, 2728-2733.

Luo, et al., "Hydrogen generation from liquid reforming of glycerin over Ni—Co bimetallic catalyst", *Biomass and Bioenergy*, 34 (2010) 488-495.

International Search Report issued Jul. 28, 2011 in PCT/KR2010/004207.

Chinese Office Action dated Feb. 8, 2014 in corresponding Chinese application.

* cited by examiner

CATALYST FOR AQUEOUS PHASE REFORMING OF BIOMASS-DERIVED POLYOLS AND PREPARATION METHOD THEREOF

TECHNICAL FIELD

The present invention relates to a catalyst for aqueous-phase reforming of biomass-derived polyols and a preparation method thereof, and more particularly to a catalyst, which is used in the aqueous-phase reforming of biomass-derived polyols to produce hydrogen, and a preparation method thereof.

BACKGROUND ART

Recently, there has been economic development and the demand for energy has rapidly increased and fossil resources such as natural gas and petroleum are being depleted, thus causing an imbalance between the demand and supply of energy. For this reason, sustainable energy supply systems have been of increasing interest, and the health and environmental risks necessarily associated with carbon dioxide emissions have been recognized. Thus, global efforts to reduce such carbon dioxide emissions have been made. Among a variety of alternative energy sources, biomass can be used as a renewable source of energy and chemical raw materials, particularly as the carbon dioxide which is generated during the conversion of biomass to energy is recycled again when the biomass is produced. Accordingly, biomass is an energy source that emits no carbon dioxide, and it is rich in oxygen compared to other fossil resources, and thus is beneficial for the production of chemical products. Owing to these advantages, many studies on the utilization of biomass have recently been conducted.

Biomass-derived polyols comprise glycerol, butylenes glycol, propylene glycol, ethylene glycol, erythritol etc.

Because biomass-derived polyols are highly useful and can serve as a primary building block in future biorefinery schemes, biomass-derived polyols are a particulary attractive biomass-derived compound. Also, bio-glycerol currently receives a great deal of attention.

Glycerol has generally been a product of the organic chemical industry. However, this source of glycerol is changing with the recent rapid development of the biodiesel industry. Biodiesel became one of the major renewable liquid transportation fuels, and the production of biodiesel involves the production of a large volume of glycerol as a byproduct. The use of this important product stream (about 10 kg of glycerol is produced per 100 kg of biodiesel) provides an important revenue stream. Because of the great usefulness of inexpensive glycerol, it is an attractive raw material which can be chemically converted.

Also, hydrogen is receiving attention as an attractive alternative energy carrier, and hydrogen fuel cells are seen as promising systems producing clean resources and electric power. However, the development of hydrogen production is currently being delayed in terms of efficiency and for environmental reasons, because the hydrogen is mainly produced by the high-temperature steam reforming of non-renewable hydrocarbons.

Because hydrogen production can offer not only economic advantages, but also greater environmental advantages, it is preferable to produce a renewable hydrogen resource such as biomass under mild conditions.

Dumesic et al. reported that hydrogen can be produced by aqueous-phase reforming of biomass-derived oxygenated compounds with a supported metal catalyst at a relatively low temperature (T<538° C.) in a single process. Typical oxygen-containing compounds include methanol, glycol, glycerol, sorbitol, xylose and glucose. Aqueous-phase reforming has an advantage in that it eliminates the need to evaporate water and oxygenated compounds, and thus can reduce the energy required for hydrogen production. Another advantage of the APR (aqueous-phase reaction) process is the production of a negligible amount of carbon monoxide (CO) (an impurity) that is known to act as a poison when $H_2$ is applied in the fuel cell field. This low level of CO results from the low-temperature operation of the APR process, at which a water-gas-shift reaction easily occurs.

The production of hydrogen by aqueous-phase reforming with a supported metal catalyst has the important problem of selectivity. The production of a mixture of $CO_2$ and $H_2$ is thermodynamically unstable compared to the production of methane and higher-molecular-weight alkanes. In addition, the above-described low selectivity for CO and the resulting effective rapid water-gas-shift reaction are particularly important.

Accordingly, a preferred catalyst material should not only minimize the production of CO and alkanes, which can be produced in a series of equilibrium reactions, but also have highly selectivity for hydrogen, and should achieve a high conversion rate of renewable raw materials.

Several types of catalysts were tested regarding the aqueous-phase reforming of renewable oxygen-containing compounds in order to evaluate the effects of the selected transition metals, supports and metal alloys on hydrogen selectivity. It was reported in the literature that a Pt/γAl$_2$O$_3$ [1] and a Sn-modified Raney-Ni catalyst [2] are the most promising catalysts.

A 1-3% Pt/γAl$_2$O$_3$ catalyst showed good results particularly in terms of hydrogen selectivity, conversion rate and stability. Thus, this catalyst is used as a benchmark catalyst for the activity and selectivity of other catalysts.

In most reports on aqueous-phase reforming reactions, fluidized-bed tubular reactors have been used to test activity. Catalyst screening studies were conducted for the purposes of identifying a promising catalyst material which would be used under batch and semi-batch conditions [3].

Various patents and various patent applications were published in the field of aqueous-phase reforming of biomass-derived oxygenated compounds for the production of hydrogen and/or hydrocarbons. The most noteworthy are the patents and patent applications attributed to Cortright and Dumesic, and the relevant patent documents are as follows.

U.S. Pat. No. 6,699,457 (2004) U.S. Pat. No. 6,964,757 (2005) and U.S. Pat. No. 6,964,758 (2005) to Cortright et al. disclose a method of producing hydrogen from oxygen-containing hydrocarbons, including methanol, glycerol, sugar and sugar alcohol, by aqueous-phase reforming in a fixed-bed tubular reactor in the presence of a metal-containing catalyst.

Preferred catalysts described in these patents comprise a metal selected from the group consisting of Group VIII transition metals, alloys thereof, and mixtures thereof. Particularly, the metal is selected from the group consisting of nickel, palladium, platinum, ruthenium, rhodium, iridium, alloys thereof, and mixtures thereof. Platinum, ruthenium or rhodium is the most preferable. The catalyst may comprise an alloy and may be admixed with copper, zinc, germanium, tin or bismuth. Also, according to the above patent documents, the amount of metal added should not exceed about 30 wt % of the VIIIB transition metal catalyst. A support is preferably selected from the group consisting of silica, alumina, zirconia, titania, ceria, carbon, silica-alumina, silica nitride, boron nitride, and mixtures thereof. Silica is preferred [4].

PCT Patent Publication No. WO 2007/075476 of Cortright discloses a bimetallic catalyst for aqueous-phase reforming of oxygenated containing compounds, particularly a combination of a Group VIIIB metal and ruthenium, and most preferably PtRe adhered to a carbon support. Also, it discloses that the addition of an oxide of La or Ce to the catalyst is preferred. In addition, it claims a high feedstock concentration of 20-50 wt % [5].

PCT Patent Publication No. WO 2009/129622 of Monnier et al. discloses a process for aqueous-phase reforming of biomass-derived oxygenated compounds, preferably glycerol, in which a heterogeneous catalyst dispersed in an aqueous phase in a stirred tank reactor (e.g., a continuous stirred tank reactor or a semi-batch stirred reactor). It discloses that platinum and nickel catalysts supported on alumina, silica, activated carbon and zeolite are preferred.

Cortright et al. discloses the oxygenated compounds of methanol, ethylene glycol, glycerol, sorbitol and glucose being converted by an aqueous-phase reforming reaction with 3% $Pt/Al_2O_3$. The reaction temperature is 225-265° C., the reaction pressure is 29-56 bar, the concentration of oxygenated compounds in the feedstock solution is 1 wt % [1].

Shabaker et al. discloses aqueous-phase reforming of 10 wt % ethylene glycol solution and shows that platinum supported on $TiO_2$, $Al_2O_3$, activated carbon, $SiO_2$, $SiO_2$—$Al_2O_3$, $ZrO_2$ or $CeO_2$ and ZnO and platinum supported on $TiO_2$, carbon or $Al_2O_3$ are effective [7].

Kunkes et al. reported the conversion of glycerol over carbon-supported Pt and Pt—Re catalysts. The addition of Re increases production of $H_2$, CO, $CO_2$ and light alkanes (mainly methane), and thus increases hydrogen selectivity [8].

Huber Huber et al. reported on the efficiency of a Sn-modified Ni catalyst for aqueous-phase reforming of oxygenated compounds, including ethylene glycol, glycerol and sorbitol (less than 5 wt %) [2].

Haller et al. disclose the use of single-walled carbon nanotubes as a stable support having Pt and Co nanoparticles. It was reported that a Pt—Co bimetallic catalyst shows good activity in aqueous-phase reforming of ethylene glycol [9].

Dong et al. reported Pt-loaded NaY as an active catalyst for aqueous-phase reforming of methanol and ethanol [10].

Souza et al. reported aqueous-phase reforming of ethanol under batch conditions over nickel catalysts prepared from hydrotalcite precursors [11].

Fierro et al. reported aqueous-phase reforming of glycerol over nickel catalysts supported on alumina modified by Mg, Zr, Ce or La. Although Zr, Ce and La increased the initial activity of the catalysts, catalyst inactivation was observed after several hours in every case [12].

Luo et al. developed a cerium catalyst for aqueous-phase reforming, which comprises nickel and cobalt additionally supported on an alumina support. It was observed that cerium suppressed sintering to reduce methane selectivity [13].

Weng et al. reported catalysts for aqueous-phase reforming of glycerol, which comprise Pt, Ni, Co or Cu supported on various supports, including SAPO-11, activated carbon, HUSY, $SiO_2$, $Al_2O_3$ and MgO. The platinum catalyst showed the highest stability and activity, and the support also showed increased activity and hydrogen selectivity. The Pt/MgO catalyst showed a great decrease in activity with the passage of time [14].

DISCLOSURE OF INVENTION

Technical Problem

One aspect of the present invention is to provide a catalyst for aqueous-phase reforming of biomass-derived polyols, which comprises platinum and copper as active metals and a mixture of magnesia and alumina as a support.

Another aspect of the present invention is to provide a method for preparing a catalyst for aqueous-phase reforming of biomass-derived polyols, wherein the catalyst comprises platinum and copper as active metals and a mixture of magnesia and alumina as a support, wherein the mixture of magnesia and alumina is prepared by the calcination of layered double hydroxide.

Still another aspect of the present invention is to provide a method of producing hydrogen using the catalyst of the present invention.

It is to be understood that the technical problems to be solved by the present invention are not limited to the aforementioned problems and other technical problems which are not mentioned will be apparent to a person of ordinary skill in the art from the following description.

Solution to Problem

According to one aspect of the present invention, there is provided a catalyst for aqueous-phase reforming of biomass-derived polyols, which comprises platinum and copper as active metals and a mixture of magnesia and alumina as a support.

According to another aspect of the present invention, there is provided a method for preparing a catalyst for aqueous-phase reforming of biomass-derived polyols, wherein the catalyst comprises platinum and copper as active metals and a mixture of magnesia and alumina as a support, wherein the mixture of magnesia and alumina is prepared by the calcination of layered double hydroxide.

According to still another aspect of the present invention, there is provided a method of producing hydrogen using the catalyst of the present invention.

Advantageous Effects of Invention

The inventive catalyst for aqueous-phase reforming of biomass-derived polyols contain a small amount of platinum, has high hydrogen selectivity and produces alkanes including methane in small amounts, compared to a platinum/alumina benchmark catalyst. Thus, the catalyst of the present invention is efficient for aqueous-phase reforming of biomass-derived polyols.

Mode for the Invention

Hereinafter, the present invention will be described in further detail.

In one aspect, the present invention provides a catalyst for aqueous-phase reforming of glycerolbiomass-derived polyols, which comprises platinum and copper as active metals and a mixture of magnesia and alumina as a support.

The production of hydrogen from biomass-derived oxygenated compounds, particularly biomass-derived polyols, requires an improved catalyst material having high efficiency and high selectivity. To solve the above-described problems, the present inventor has developed a novel catalyst having high efficiency and high selectivity.

The present inventors have found that a specific combination of platinum and copper supported on a mixture of magnesium oxide (magnesia) and aluminum oxide (alumina) has low selectivity for undesirable byproducts such as methane and, at the same time, shows increased hydrogen productivity and selectivity.

According to one aspect of the present invention, the most preferred catalyst comprises a mixture of platinum and copper. The use of a bimetallic catalyst, particularly a combination of platinum and copper, increases hydrogen selectivity in a hydrogen production system and, at the same time, reduces the production of methane.

Also, it eliminates the need to load a large amount of platinum, so that the amount of platinum loaded is reduced, thus providing cost advantages.

According to one embodiment of the present invention, the loading amount of platinum is preferably 0.1-2.0 wt %.

Copper alone is not efficient for aqueous-phase reforming of biomass-derived polyols, but when it is added to platinum to form a bimetallic catalyst of platinum and copper, it has increased hydrogen selectivity, even when the loading amount of platinum is small.

In the case in which a small amount of platinum is loaded, if the loading amount of copper is increased, the production of methane will be decreased.

In one embodiment of the present invention, the content of copper in the catalyst is preferably 0.05-1.0 wt % [P1].

The support of the catalyst according to the present invention is composed of a mixture of magnesia and alumina. The use of the magnesia/alumina mixture as the catalyst support shows excellent hydrogen selectivity compared to either the use of alumina alone as the support or the use of layered double hydroxide as the support. When the ratio of magnesia in the magnesia/alumina mixture is increased, hydrogen productivity and selectivity are increased. In one embodiment of the present invention, the Mg/Al ratio is preferably 0.5-5.0.

In aqueous-phase reforming of biomass-derived polyols, biomass-derived polyols are used as a feedstock. Even when the concentration of biomass-derived polyols in the feedstock solution is increased, high hydrogen selectivity is shown. The concentration of biomass-derived polyols is not specifically limited, but is preferably 5-50 wt % in one embodiment of the present invention.

In another aspect, the present invention provides a method for preparing a catalyst for aqueous-phase reforming of biomass-derived polyols, wherein the catalyst comprises platinum and copper as active metals and a mixture of magnesia and alumina as a support, wherein the mixture of magnesia and alumina is prepared by calcination of layered double hydroxide.

In the inventive method for preparing the catalyst for aqueous-phase modifying of biomass-derived polyols, the magnesia/alumina mixture prepared by calcining the layered double hydroxide is used as the support.

When the support is made of the magnesia/alumina mixture prepared by calcining the layered double hydroxide, the catalyst has increased hydrogen selectivity. The calcination temperature of the layered double hydroxide is not specifically limited, but is preferably between 400° C. and 900° C. in one embodiment of the present invention.

In still another aspect, the present invention provides a method of producing hydrogen using the inventive catalyst for aqueous-phase reforming of biomass-derived polyols or the catalyst prepared by the inventive method for preparing the catalyst for aqueous-phase reforming of biomass-derived polyols.

Hereinafter, the present invention will be described in further detail with reference to examples. However, these examples are for illustrative purposes only and are not intended to limit the scope of the present invention.

EXAMPLES

The reactor system used in the present invention, the preparation of a catalyst according to the present invention, the properties of the catalyst, a substrate, and test conditions are as follows.

Reactor System

Aqueous-phase reforming was carried out in a semi-batch reactor system equipped with a back pressure controller and a cooling trap. For the online measurement of a gaseous reaction product, the system is connected with a dual channel Varian CP 4900 microGC (1 m PorabondQ pretreatment column with 1 m COX analysis column and 6 m CP—Si15CB) equipped with TCD. Hydrogen, carbon dioxide, CO and methane are analyzed on the COX column, whereas alkanes are quantified on the CP-Sil column. The detection limit of CO is about 500 ppm in the used conditions. The liquid phase is analyzed using a Shimadzu 2010A GC equipped with a FID detector in a CP-WAX 57CB column.

In a typical process, the reactor is charged with 10 wt % glycerol solution and a heterogeneous catalyst (0.3 g), and then pressurized with helium to 29 bar. The mixture is heated to 225° C. and then maintained for 5 hours at that temperature. A gaseous product formed during glycerol reforming was measured by the online microGC at 30 minute intervals.

Catalyst Preparation

Methods for preparing relevant supports and catalysts are as follows.

Experimental Example 1

Preparation of Mixed Mg(O)Al Support

The mixed oxide was prepared by calcination of a parent layered double hydroxide (LDH; PURAL MG70; available from Sasol) having a Mg/Al ratio of 0.54-2.95. The LDH pellets were prepared, crushed and then sieved to obtain a 0.212-0.425 mm size fraction. The parent LDH was calcined overnight in a nitrogen atmosphere at 400° C.

Example 1

Preparation of 1 wt % Pt/0.5 wt % Cu on Mg(Al)O

For the preparation of a 1 wt % Pt-0.5 wt % Cu/Mg(Al)O catalyst, $Pt(NH_3)_4(NO_3)_2$ and $Cu(NO_3)_2.3H_2O$ precursor salts were used. After impregnation, the sample was dried in an oven at 80° C. for 17 hours, and then calcined at 300° C. in an atmosphere of 20% $O_2$/80% N2. Before a catalyst activity test, all the catalyst was reduced in an atmosphere of $H_2$ at 400° C. for 2 hours.

Example 2

Preparation of 0.75 wt % Pt/0.13 wt % Cu on Mg(Al)O

A 0.75 wt % Pt-0.13 wt % Cu/Mg(Al)O catalyst was prepared in the same manner as Example 1, except that $Pt(NH_3)_4(NO_3)_2$ and $Cu(NO_3)_2.3H_2O$ precursor salts were used.

Comparative Example 1

Preparation of 1 wt % Pt on $Al_2O_3$

An alumina-supported platinum catalyst having a Pt loading of 1 wt % was prepared by incipient wetness impregnation of γ-alumina. The alumina extrudate (surface area: 195 $m^2/g$, and pore volume: 0.65 mL/g) was purchased from BASF, crushed and then sieved to a size of 0.212-0.425 mm. Incipient wetness impregnation was performed with an aqueous solution of $Pt(NH_3)_4(NO_3)_2$ (Aldrich).

0.07946 M platinum solution having a preferred amount of platinum was impregnated into 2.32 g of $Al_2O_3$. After impregnation, the sample was dried in an oven at 80° C. for 17 hours, and then calcined at 300° C. in an atmosphere of 20% $O_2$/80% $N_2$. Before a catalyst activity test, the catalyst was reduced in an atmosphere of $H_2$ at 400° C. for 2 hours.

Comparative Example 2

Preparation of 1 wt % Pt on Mg(Al)O

A $Pt(NH_3)_4(NO_3)_2$ solution having a preferred amount of platinum was impregnated into a Mg(Al)O support which has been prepared by calcination of a parent LDH having a Mg/Al of 2.95. After impregnation, the sample was dried in an oven at 80° C. for 17 hours, and then calcined at 300° C. in an atmosphere of 20% $O_2$/80% $N_2$. Before a catalyst activity test, the catalyst was reduced in an atmosphere of $H_2$ at 400° C. for 2 hours.

Oxygenated Hydrocarbons

Typically, reactions were carried out with 10 wt % and 20 wt % glycerol solutions in nonionized water.

Aqueous-Phase Reforming

Data obtained from catalyst activity tests are listed in Tables 1 to 6.

Supports

Several different supports were examined to test the effects thereof on aqueous-phase reforming with platinum as an active element. The mixed Al—Mg oxide was confirmed to be a particularly interesting support candidate group. This mixed oxide was obtained by calcining layered double hydroxide (PURAL MG70 purchased from Sasol) in a $N_2$ atmosphere.

The catalyst test results were compared with those for a 1 wt % $Pt/Al_2O_3$ benchmark catalyst prepared in the laboratory of the present inventor. The effects of the supports (1 wt % platinum as an active metal phase in every case) on the catalyst activity are shown in Table 1 below. The effects of the calcination temperatures of the parent LDH on catalyst activity (1 wt % platinum as an active metal phase in every case) are shown in Table 2 below.

TABLE 1

Effects of catalyst supports (1 wt % platinum, 10 wt % glycerol, 225° C., 29 bar, 3.5 hours)

| Entry | Catalyst | $H_2$ % | $CO_2$ % | $CH_4$ % | $H_2$/$CO_2$ % | $H_2$ selectivity % |
|---|---|---|---|---|---|---|
| 1 | 1 wt % Pt/Mg(Al)O[a] | 57.61 | 30.56 | 5.49 | 1.89 | 58.25 |
| 2 | 1 wt % Pt/$Al_2O_3$ | 56.85 | 32.55 | 6.50 | 1.75 | 56.46 |
| 3 | 1 wt % Pt/LDH | 56.22 | 32.16 | 5.15 | 1.75 | 55.03 |

[a]Mg/Al 2.95

TABLE 2

Effects of calcination temperatures (1 wt % Pt/Mg(Al)O(Mg/Al 2.95), 10 wt % glycerol, 225° C., 29 bar, 5 hours)

| Entry | Calcination temperature (° C.) | $H_2$ % | $CO_2$ % | $CH_4$ % | $H_2$/$CO_2$ % | $H_2$ selectivity % | Glycerol conversion rate |
|---|---|---|---|---|---|---|---|
| 1 | 400 | 57.61 | 30.56 | 5.49 | 1.89 | 58.25 | >97 |
| 2 | 600 | 55.01 | 32.58 | 4.88 | 1.69 | 52.56 | >97 |
| 3 | 900 | 53.34 | 32.63 | 5.94 | 1.67 | 51.00 | >97 |

As can be seen in Tables 1 and 2 above, the 1 wt % Pt/Mg(Al)O(Mg/Al 2.95) catalyst of the present invention showed excellent performance in terms of hydrogen selectivity and methane production compared to the 1 wt % Pt/$Al_2O_3$ benchmark catalyst. Also, the calcination of the parent layered double hydroxide before impregnation with platinum salt could increase hydrogen selectivity.

Meanwhile, the calcination temperature of the parent layered double hydroxide had an effect on catalyst activity. It was preferably 400-900° C. and showed the highest activity at 400° C.

The catalyst of the present invention was tested at a Mg/Al ratio ranging from 0.54 to 2.95, and the effects of the Mg/Al ratio on hydrogen selectivity are shown in Table 3 below. As can be seen in Table 3, an increase in the ratio of magnesium had a positive effect on hydrogen production and selectivity, and the most preferred Mg/Al ratio was 2.95.

TABLE 3

Effects of Mg/Al ratio (1 wt % Pt/Mg(Al)O, calcined at 400° C., 10 wt % glycerol, 225° C., 29 bar, 5 hours)

| Entry | Mg/Al ratio | $H_2$ % | $CO_2$ % | $CH_4$ % | $H_2$/$CO_2$ % | $H_2$ selectivity % | Glycerol conversion rate |
|---|---|---|---|---|---|---|---|
| 1 | 0.54 | 54.23 | 32.45 | 6.19 | 1.67 | 50.78 | >97 |
| 2 | 1.27 | 55.94 | 29.75 | 5.14 | 1.88 | 54.41 | >97 |
| 3 | 2.95 | 57.61 | 30.56 | 5.49 | 1.89 | 58.25 | >97 |

Metal Phase

After optimizing support parameters, including a preferred support (Mg(Al)O) for the inventive catalyst, calcination temperature (400° C.), and Mg/Al ratio (2.95), the effects of transition metal types on catalyst activity were evaluated, and the evaluation results are shown in Table 4 below. The results indicated that platinum was the most preferable metal.

TABLE 4

Effects of transition metals (1 wt % M/Mg(Al)O (2.95), calcined at 400° C., 10 wt %, 225° C., 29 bar, 5 hour)

| Entry | Metal | $H_2$ % | $CO_2$ % | $CH_4$ % | $H_2/CO_2$ % | $H_2$ selectivity % | Glycerol conversion rate |
|---|---|---|---|---|---|---|---|
| 1 | Pt | 57.61 | 30.56 | 5.49 | 1.89 | 58.25 | >97 |
| 2 | Cu[a] | — | — | — | — | — | — |
| 3 | Ni[a] | — | — | — | — | — | — |

[a]No activity was observed.

Furthermore, the effects of bimetallic systems on hydrogen selectivity and the suppression of methane formation were evaluated, and the evaluation results are shown in Table 5 below.

TABLE 5

Effects of copper addition and metal loading amount (Pt-Cu/Mg(Al)O (2.95), calcined at 400° C., 10 wt % glycerol, 225° C., 29 bar, 5 hours)[a]

| Entry | Metal loading amount | $H_2$ % | $CO_2$ % | $CH_4$ % | $H_2/CO_2$ % | $H_2$ selectivity % |
|---|---|---|---|---|---|---|
| 1 | 1 Pt-0 Cu | 56.35 | 31.60 | 3.79 | 1.78 | 55.33 |
| 2 | 0.75 Pt-0.13 Cu | 58.08 | 31.32 | 3.03 | 1.85 | 59.38 |
| 3 | 1 Pt-0.25 Cu | 56.49 | 32.46 | 3.41 | 1.74 | 55.64 |
| 4 | 1Pt-0.5 Cu | 57.26 | 30.52 | 2.20 | 1.88 | 57.42 |
| 5 | 3 Pt-1 Cu | 56.33 | 31.12 | 3.53 | 1.81 | 55.28 |

[a]At the end of reactions in all the entries, no glycerol was detected by GC.

As can be seen in Table 5 above, the most preferable reforming catalyst included a mixture of platinum and copper. The use of the bimetallic catalyst, particularly, the combination of platinum and copper, increased hydrogen selectivity in the hydrogen production system and, at the same time, reduced the production of methane. Also, an increase in the loading amount of platinum did not lead to an improvement in catalyst performance, suggesting that the loading amount of platinum could be reduced, thus providing advantages in terms of cost. The preferred loading amount of platinum was 0.75-1 wt %.

The addition of copper increased hydrogen selectivity at a small loading amount of platinum (0.75-1 wt %). In addition, an increased loading amount of copper (0.13-0.5 wt %) showed a decrease in methane production at a small loading amount of platinum (0.75-1 wt %). The preferred amount of the bimetallic catalyst for the lowest methane production was 1 wt % Pt-0.5 wt % Cu.

No carbon monoxide (CO) was detected in all the catalysts of the present invention. The detection limit of the microGC used is about 500 ppm, and thus the limited CO production of the inventive catalyst was identical to that of the Pt/$Al_2O_3$ benchmark (reported to be about 300 ppm).

The effects of glycerol concentration on aqueous-phase reforming of glycerol were evaluated, and the evaluation results are shown in Table 6 below. Hydrogen selectivity was maintained even when the concentration of glycerol in the feedstock was increased to 20 wt %. It was reported that methane productivity was reduced at higher glycerol concentrations.

TABLE 6

Effects of glycerol concentrations in feedstocks (0.75 wt % Pt 0.13 wt % Cu/Mg(Al)O, calcined at 400° C., 225° C., 29 bar, 3.5 hours)

| Entry | Glycerol concentration | $H_2$ % | $CO_2$ % | $CH_4$ % | $H_2/CO_2$ % | $H_2$ selectivity % |
|---|---|---|---|---|---|---|
| 1 | 10 wt % | 58.08 | 31.32 | 3.03 | 1.85 | 59.38 |
| 2 | 20 wt % | 57.65 | 30.98 | 2.06 | 1.86 | 58.22 |

In addition to the catalyst of the present invention having high hydrogen selectivity yet low methane selectivity, it can also be seen to have a low platinum content and, at the same time, to be significantly improved in performance in terms of hydrogen selectivity and methane selectivity, compared to the benchmark catalyst 1 wt % Pt/$Al_2O_3$.

REFERENCES

1. Cortright, R. D.; Davda, R. R.; Dumesic, J. A., Hydrogen from catalytic reforming of biomass-derived hydrocarbons in liquid water. Nature 2002, 418, 964.
2. Huber, G. W.; Shabaker, J. W.; Dumesic, J. A., Raney Ni—Sn catalyst for $H_2$ production from Biomass-derived hydrocarbons. Science 2003, 300, 2075.
3. Huber, G. W.; Dumesic, J. A., An overview of aqueous-phase catalytic processes for production of hydrogen and alanes in a biorefinery. Catal. Today 2006, 111, 119.
4. Cortright, R. D.; Dumesic, J. A. Low-temperature hydrogen production from oxygenated hydrocarbons. U.S. Pat. No. 6,699,457 B2, 2004; Cortright, R. D.; Dumesic, J. A. Low-temperature hydrogen production from oxygenated hydrocarbons. U.S. Pat. No. 6,964,758 B2, 2005.
5. Cortright, R. D.; Vollendorf, N. W.; Hornemann, C. C.; McMahon, S. P. Catalysts and methods for reforming oxygenated compounds. WO 2007/075476 A2, 2007.
6. Monnier, J.; Zhang, Y.; McFarlan, A. Production of hydrogen from oxygenated hydrocarbons. WO2009/129622 A1, 2009.
7. Shabaker, J. W.; Huber, G. W.; Davda, R. R.; Cortright, R. D.; Dumesic, J. A., Aqueous-phase reforming of ethylene glycol over supported platinum catalysts. Catal. Lett. 2003, 88, 1.
8. unes, E. L.; Simonetti, D. A.; Dumesic, J. A.; Pyrz, W. D.; Murillo, L. E.; Chen, J. G., The role of rhenium in the conversion of glycerol to synthesis gas over carbon-supported platinum-rhenium catalysts. J. Catal. 2008, 260, 164.
9. Wang, X.; Li, N.; Pfefferle, L. D.; Haller, G. L., Pt—Co bimetallic catalyst supported on single walled carbon nanotube: XAS and aqueous phase reforming activity studies. Catal. Today 2009, 146, 160.
10. Tang, Z.; Monroe, J.; Dong, J.; Nenoff, T.; Weinauf, D., Platinum-loaded NaY zeolite for aqueous phase reforming of methanol and ethanol to hydrogen. Ind. Eng. Chem. Res. 2009, 48, 2728.
11. Cruz, I. O.; Ribeiro, N. F. P.; Aranda, D. A. G.; Souza, M. M. V. M., Hydrogen production by aqueous-phase reforming of ethanol over nicel catalysts prepared from hydrotalcite precursors. Catal. Commun. 2008, 9, 2606.
12. Iriondo, A.; Barrio, V. L.; Cambra, J. F.; Arias, P. L.; Guemez, M. B.; Navarro, R. M.; Sanchez-Sanchez, M. C.; Fierro, J. L. G., Hydrogen production from glycerol over nicel catalysts supported on $Al_2O_3$ modified by Mg, Zr, Ce, or La. Top. Catal. 2008, 49, 46.

13. Luo, N.; Ouyang; Cao, F.; Xiao, T., Hydrogen generation from liquid reforming of glycerin over Ni—Co bimetallic catalyst. *Biomass and Bioenergy* 2010, 34, 489.
14. Wen, G.; Xu, Y.; Ma, H.; Xu, Z.; Tian, Z., Production of hydrogen by aqueous phase reforming. *Int. J. Hydrogen Energy* 2008, 33, 6657.

The invention claimed is:

1. A method of producing hydrogen by carrying out aqueous-phase reforming of a feedstock comprising biomass-derived polyols in the presence of a bimetallic catalyst which comprises active metals consisting of platinum and copper and a mixture of magnesia and alumina as a support, wherein the contents of platinum and copper in the catalyst are 0.1-2.0 wt % and 0.05-1.0 wt %, respectively, based on total weight of the catalyst, and wherein the mixture of magnesia and alumina has a Mg/Al ratio of 0.5-5.0 and is prepared by calcination of layered double hydroxide.

2. The method of claim 1, wherein the biomass-derived polyols are fed at a concentration of 5-50 wt % in the feedstock during the aqueous-phase reforming of biomass-derived polyols.

* * * * *